United States Patent [19]

Neubert et al.

[11] Patent Number: 4,848,266
[45] Date of Patent: Jul. 18, 1989

[54] DEVICE FOR TREATING INTERNAL SURFACES OF CYLINDRICAL ARTICLES

[75] Inventors: Eberhard Neubert; Hans-Michael Wardenga; Gottlieb Polzer, all of Zwickau; Juergen Lange, Werdau; Klaus Schrader, Zwickau; Frank Junker; Norbert Dittmann, both of Radebeul; Ullrich Spevacek; Hans-Juergen Tappert, both of Coswig, all of German Democratic Rep.

[73] Assignee: Veb Kombinat Polygraph "Werner Lamberz" Leipzig, Leipzig, German Democratic Rep.

[21] Appl. No.: 98,032

[22] Filed: Aug. 28, 1987

[30] Foreign Application Priority Data

Aug. 29, 1986 [DD] German Democratic Rep. .................................. 2939668

[51] Int. Cl.$^4$ ...................... C05C 11/00; F16N 15/00
[52] U.S. Cl. ......................................... 118/76; 427/11
[58] Field of Search ...................... 118/76, 77; 427/11; 194/99

[56] References Cited

FOREIGN PATENT DOCUMENTS 215095 10/1984 German Democratic Rep. ... 118/76

Primary Examiner—John McIntosh
Attorney, Agent, or Firm—Michael J. Striker

[57] ABSTRACT

A device for treating internal surfaces of cylindrical objects by rubbing includes a plurality of rubbing pins each provided with two pin clamping devices one of which is displaceable relative to the other so that each pin can be adjusted relative to a workpiece.

3 Claims, 1 Drawing Sheet

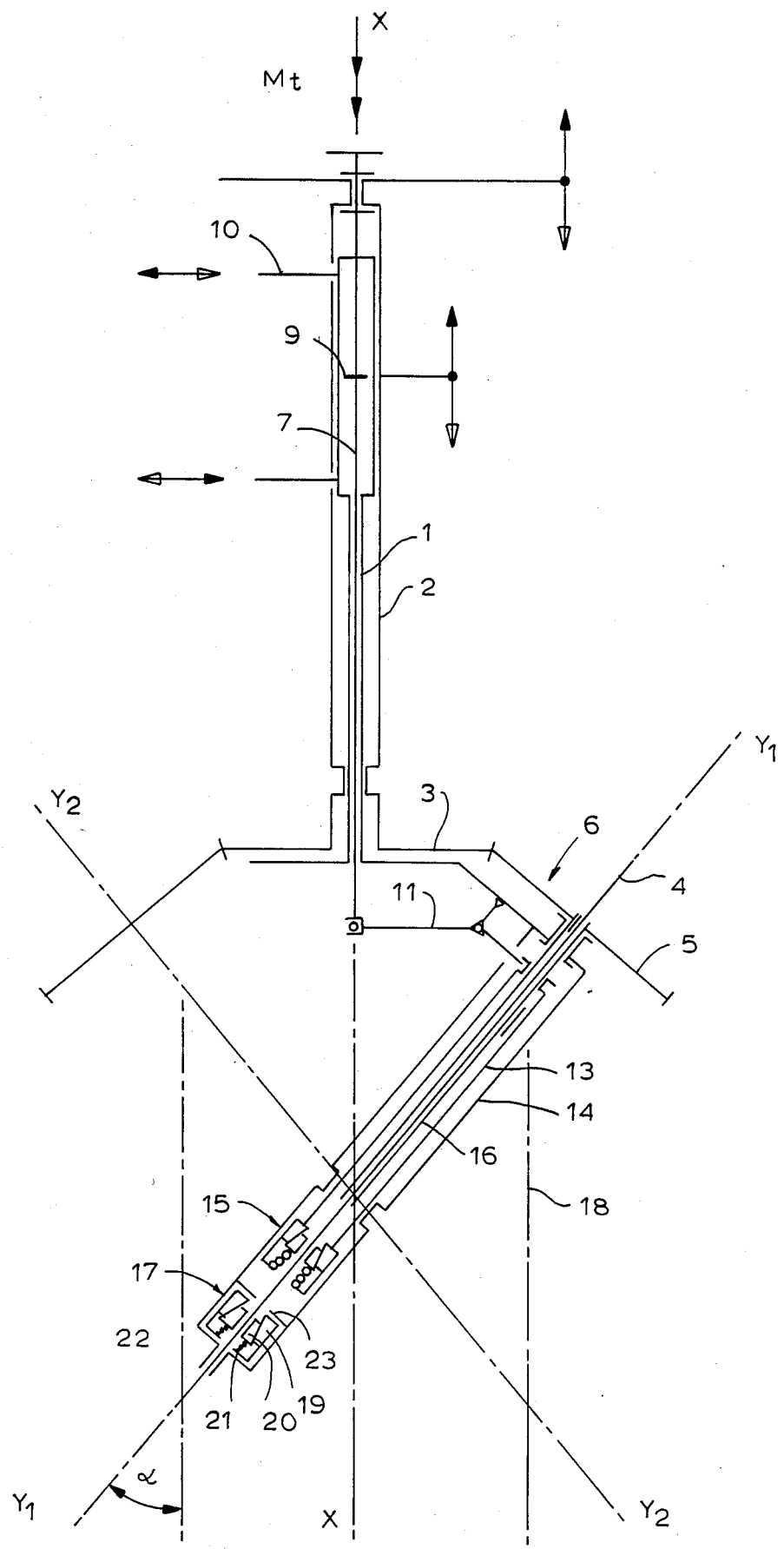

DEVICE FOR TREATING INTERNAL SURFACES OF CYLINDRICAL ARTICLES

BACKGROUND OF THE INVENTION

The present invention relates to a device for treating internal surfaces of cylindrical parts, particularly cylindrical sliding sleeves.

Known devices of the type under discussion include a plurality of rotating rubbing pins for improving the insertion of structural components, reducing a friction force, increasing reliability and service life, reducing corrosion due to friction and improving of endurance ratio according to requirements.

One of such known devices which has been disclosed is a device for coating metallic inner surfaces, particularly cylindrical sliding sleeves, in which device two rubbing forces are applied opposite one another to two shafts wherein both shafts are driven by a drive which is connected with a motor via transmission and, at the same time, these shafts are loaded during the rubbing process from a pressure cylinder with a constant pressure via pressure elements, which pressure is continually adjustable by the pressure cylinder.

The aforedescribed known device has the disadvantage that it is not suitable for coating of standing cylindrical blocks. Furthermore, the feeding or advancing of the rubbing pins is complex and involves high technical expense.

A device for coating inner surfaces of metallic objects has been disclosed, in which device two rotary rubbing pins are positioned in a head at an acute angle relative to each other and the two pins are coupled with one another by a transmission member with a drive unit and pressure unit. In order to coat internal surfaces of, for example, cylindrical sliding sleeves, it is required to impart a rotational movement to the pins.

The disadvantage of this last described device resides in that the coating of the immovable motor block is not possible, and a simultaneous coating of a number of bores in one motor block cannot be realized either. Further, the device is applicable to the machines which must be built specifically for such a device so that the device becomes very expensive to make and use.

SUMMARY OF THE INVENTION

It is an object of this invention to provide an improved device for treating internal surfaces of cylindrical objects, particularly cylindrical sliding sleeves.

It is another object of the invention to provide a device of the foregoing type which is less expensive in manufacture as compared to conventional devices.

These and other objects of the invention are attained by a device for the treatment of internal surfaces of cylindrical articles, particularly sliding sleeves by rubbing comprising a plurality of rotary rubbing pins; means for adjusting said pins due to wear; a hollow shaft (13) supporting each pin; and a plurality of pin supporting means each including a stationary clamping device for clamping each pin and a displaceable clamping device also clamping each pin at a distance from said stationary clamping device; and an axially movable piston having a rod operatively connected to said displaceable clamping device of each supporting means to move the latter, said displaceable clamping device being secured to said hollow shaft.

Each clamping device may include external wedge grips and internal wedge grips, and springs biasing said internal wedge grips.

The pin supporting means may each include a further hollow shaft receiving a respective rubbing pin, and a rotatable pinion rigidly connected with said hollow shaft.

Said hollow shaft may be rotation-fixed relative to said further hollow shaft but displaceable in an axial direction thereof.

Each of the supporting means may be positioned in a respective one of the bores provided in the rubbing head.

The chief advantage of the present invention resides in that a quick and reliable feed of the rubbing pins, subject to wear, can be obtained. This device ensures by simple means that the rubbing pin always abuts against the workpiece and is adjusted after being worn off.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing schematically illustrates a device for treating inner surfaces, particularly of cylindrical sliding sleeves, according to the invention.

DETAILED DESCRIPTION OF THE PREFERRED EMBODIMENTS

Referring now to the drawing in detail the figure shows a support and infeed arrangement for rubbing pins of a friction-coating head. The finishing or coating head includes a rotationally-stationary housing 2 on which a spur bevel gear 3 is rigidly mounted. A drive spindle 1 is supported in the housing 2. An axially driven piston rod 7 of piston 9 of the cylinder piston unit is received in the drive spindle 1. At the lower portion of housing 2, is supported a cylindrical rubbing head 6 which is rotational relative to housing 2. Two rubbing pins 4 positioned at an angle relative to each other are located in the rubbing head 6. Only one rubbing pin 4 is illustrated in the drawing. The rubbing pins 4 are formed of brass or another suitable material. It is also conceivable, for another application of the invention, to insert into the device electrodes or other tools in place of the rubbing pins 4. The rubbing head has bores 14 in each of which a pin feeding and supporting device is accommodated.

Each rubbing pin 4 is provided at the upper end of the rubbing head 6 with a pinion 5 which is rotationally supported on the rubbing head and each connected with the spur bevel gear 3 via a respective toothing.

The drive of the spindle 1 is known and is not described herein in detail.

The aforementioned piston 9 is loadable by a pneumatic or hydraulic connection 10 while the piston rod 7 is pivotally connected to a two-arm lever 11. The latter is movably supported by a bearing 12 in the rubbing head 6 and is engaged with a hollow shaft 13 which is positioned in a bore 14 of the rubbing head 6. A displaceable clamping device 15 is rigidly mounted on the hollow shaft 13. This shaft is rotation-fixed with a second hollow shaft 16 and is supported in the rubbing head 6. The first hollow shaft 13 surrounds the second hollow shaft 16 and is axially displaceable relative to the latter. The second hollow shaft 16 is rigidly connected to the respective pinion 5.

As seen in the drawing the position of the arrangement for the second rubbing pin is schematically shown by $Y_2$—$Y_2$.

The respective pin 4 is guided and supported in the position $Y_1$—$Y_1$ ($Y_2$—$Y_2$) by the second hollow shaft 16 and is displaced from the bore 14 of the head 6 wherein each pin is applied to a workpiece 18. Pin 4 extends outwardly from bore 14 of the rubbing head at the lower end of the rubbing head.

A stationary clamping device 17 provided at the lower end of the rubbing head corresponds to the displaceable clamping device 15. The stationary clamping device 17 is secured by stops 23. The clamping devices 15, 17 have each external and internal wedge grips 19, 20 which are biased by springs 21.

The mode of operation of the device according to the invention is as follows:

The workpiece 18 to be coated is placed against the rubbing head 6. The rubbing head is shifted to rotation relative to the rotation-fixed housing 2 by the drive spindle 1. The pinions 5 engaged with the spur bevel gear 3 and rotated thereby about the axes of the rubbing pins shift the pins 4 to rotation so that theses rubbing pins carry out a rotating relative motion to the rubbing head 6. At the same time, the piston rod 7 which acts on the lever 11 and hollow shaft 13 performs the axial motion which is transmitted to the pins 4 so that these pins continually abut against the workpiece 18. The entire length of the workpiece 18 can be treated by a not-shown but conventional feed unit for the axial motion.

Due to wear, an adjustment of the rubbing pins relative to the workpiece 18 is necessary; thus the piston 9 will be loaded by the hydraulic or pneumatic connection 10 in the direction of the rubbing head 6. The first hollow shaft 13 with the displaceable clamping device 15 are moved by the piston rod 7 and lever 11 in the direction of a respective pinion 5 whereby the external wedge grips of the clamping device 17 are pulled towards the stops 23 and the second clamping device 17 is locked and the respective pin is arrested whereas the displaceable clamping device 15, due to friction occurring between the internal wedge grips 20 and pin 4, is moved against springs 21 and opens internal wedge grips 20.

When a sufficiently long stroke is executed between the rubbing pin 4 and hollow shaft 13 the direction of movement of piston 9 is reversed so that the displaceable clamping device 15 is moved toward the stationary clamping device 17. Due to the reverse of the movement direction, the wedge grips 20 of the stationary clamping device are released whereas the wedge grips 19, 20 of the displaceable clamping device 15 are closed.

Thereby the rubbing pin 4 is taken along and moved relative to the inner surface of the workpiece so that the pin lies on the workpiece and can treat it further. During the process of treatment of the workpiece, the piston 9 and thereby rubbing the pin 4 is continually loaded with a constant pressure and, upon abrasion of the pin, an automatic feed up to the end position of the rubbing pin in the manner as described hereinabove is carried out.

It will be understood that each of the elements described above, or two or more together, may also find a useful application in other types of devices for machining internal surfaces of cylindrical articles differing from the types described above.

While the invention has been illustrated and described as embodied in a device for machining internal surfaces of cylindrical parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for the treatment of internal surfaces of cylindrical sliding sleeves, comprising:
   a plurality of rotary rubbing pins;
   clamping means for clamping said pins, said clamping means including a stationary clamping device and an axially displaceable clamping device, both of said clamping devices having external and internal wedge grips and spring means biasing against said internal wedge grips so that said external and internal wedge grips clamp said pins; and
   means for adjusting said pins due to wear, said adjusting means including a lever, a first hollow shaft engaging said lever and mounted to said displaceable clamping device, an axially displaceable piston rod pivotally connected to said lever for moving said first hollow shaft, a second hollow shaft arranged within said first hollow shaft, and a pinion connected to said second hollow shaft, said first hollow shaft with said displaceable clamping device being movable relative to said pinion in response to said piston rod axially displacing.

2. The device as defined in claim 1, wherein said first hollow shaft is rotation-fixed relative to said second hollow shaft but displaceable in an axial direction thereof.

3. The device as defined in claim 1, assigned to a rubbing head having a plurality of bores, each of said pins being positioned in a respective one of said bores.

* * * * *